3,251,646
PROCESS FOR THE RECOVERY OR PURIFICATION OF METALS BY LIQUID-LIQUID EXTRACTION
Alexander Alon and Avraham M. Baniel, Haifa, Ruth Blumberg, Mount Carmel, Haifa, Abraham Mitzmager, Kiriat Bialik, Haifa, and Leonard Marshall Shorr, Romema, Haifa, Israel, assignors, by mesne assignments, to Israel Mining Industries-Institute for Research and Development, a company of Israel
No Drawing. Filed Aug. 24, 1962, Ser. No. 219,123
Claims priority, application Israel, Sept. 14, 1961, 16,017
10 Claims. (Cl. 23—50)

This invention relates to processes for the recovery or purification of metals by a liquid-liquid extraction process in which the metal is transferred from an aqueous phase into an organic solvent phase by means of an acid reagent—hereinafter referred to as "extractant"—forming with the metal a compound—hereinafter called "transfer compound"—which, when becoming distributed between the aqueous and solvent phases, concentrates in the latter.

The successful development of liquid-liquid extraction processes for the recovery or purification of uranium and some other rare metals has shown their advantages in transferring the desired metal selectively from the dilute initial solution in which it is present to a more concentrated solution suitable for processing. However, the extractants hitherto used in the extraction of these rare metals cannot be used for the extraction of more common metals for known technical and economic reasons, and no satisfactory extractant has so far become known for the recovery and purification of such metals on a commercial scale.

The practical performance of such liquid-liquid extraction processes depends on a variety of factors, among them the following:

(a) Both the extractant and the transfer compound must be well soluble in the extracting solvent, but little soluble in water;
(b) Under given conditions (e.g. of pH and temperature) the extractant must extract the desired metal or metals from the aqueous phase in preference to other metals dissolved in the aqueous phase, and the selectivity of the extractant should preferably be variable by variation of the conditions of the extraction process;
(c) The extractant must be stable under the conditions of operation, and it must be obtainable at low cost;
(d) The formation of the transfer compound must proceed with satisfactory speed;
(e) The transfer compound must be easy to decompose for the liberation of the metal and the regeneration of the extractant.

These conditions are so exacting and include so many variables that virtually no prediction can be made regarding the applicability of specific reagents to the separation of any specific metal from a given aqueous system by liquid-liquid extraction processes.

Basically, the liquid-liquid metal extraction processes by means of an acid extractant can be conceived as cation exchange processes according to the equation

$$n\text{HA} + \text{M}^n \rightleftharpoons \text{MA}_n + n\text{H}^+$$

where M is the metal to be extracted, $n$ its valency, and A the anion of the extractant.

When the ions of the metal M are extracted from the aqueous phase into a solution of the extractant (which is a free acid) in an organic solvent, an equivalent quantity of hydrogen ions is transferred to the aqueous phase. In order to achieve an appreciable transfer of metal to the organic phase, it is as a rule necessary to remove hydrogen ions from the aqueous phase so that the reaction may proceed to the right side of the equation. This is usually done by neutralizing the liberated acidity in the aqueous phase by the addition of NaOH, $Na_2CO_3$ or similar strongly basic substances. All these chemicals are expensive and constitute a total loss, since the impure alkali-metal sulfates, chlorides or nitrates thus formed cannot economically be recovered and purified. The use of cheap weaker bases, especially slaked lime, or of carbonates such as limestone, dolomite or the like, cannot be considered where the extractant is, for example, an aliphatic carboxylic acid or a naphthenic acid, since in the case of these acids the concentration of hydrogen ions in the aqueous phase in the course of the extraction is so low that the aqueous phase cannot be neutralized by the weaker bases or by the carbonates aforesaid at a sufficiently high rate to allow the formation of the transfer compound in satisfactory amounts and at a satisfactory speed, and the pH of the aqueous phase must be raised. For example, in the case of naphthenic acids the pH of the aqueous phase has to be raised almost to the point at which metal hydroxides are precipitated in the aqueous phase, among them the hydroxide of the metal which should be extracted.

A further drawback of aliphatic carboxylic acids and naphthenic acids, which makes them unsuitable as acid extractants for the liquid-liquid extraction of various metals, is the fact that in the presence of metal ions, they are apt to become very viscous and to form thick emulsions with the aqueous phase, even at rather low transfer compound concentrations in the solvent phase, e.g. 0.1 to 0.2 molar, so that the phases cannot be separated.

The invention has the object to provide a new class of extractants for use in liquid-liquid extraction process for the recovery or purification of metal with a view to making these processes applicable to a large number of metals, most of them common metals, to which these processes could not so far be applied for a variety of reasons. These metals are mainly the following: nickel, cobalt, copper, manganese, chromium, gold, silver, titanium, aluminium, beryllium, zinc, cadmium, iron and lead.

The terms "recovery" and "purification" are used in connection with the present invention for various different operations, especially the following:

(a) The extraction of a desired metal from a crude aqueous solution, e.g. an acid leach liquor, in which a salt of the desired metal is contained in solution together with other metal salts, e.g. a liquor produced by the leaching of an ore with sulfuric, hydrochloric or nitric acid;
(b) The concentration of a desired metal by extraction from a dilute aqueous solution and re-transfer into water where it now forms a more highly concentrated solution;
(c) The purification of a desired metal, and possibly its simultaneous concentration, by extraction from an already relatively pure aqueous solution from which the impurities are not extracted by the same operation;
(d) The purification of a desired metal by the extraction of undesired metals from an aqueous solution in which the desired metal is left behind after the extraction;
(e) The separation of leach liquors, obtained by the leaching of complex ores, into two or more streams containing each a different one of the several metals extracted from the ore by the leaching operation. The streams can be processed separately by conventional means.

The invention consists in a process for the extraction of metals from the aqueous solutions of their salts by the temporary conversion of such metal salt into a salt ("transfer compound") of an organic acid serving as an extractant, extraction of the transfer compound from the aqueous solution into an organic solvent substantially immiscible with water, decomposition of the transfer compound and recovery of the metal from the solvent phase by treatment with an aqueous acid, which process is characterized in that an $\alpha$-halogeno-carboxylic acid is used as the extractant.

Among the $\alpha$-halogeno-carboxylic acids, $\alpha$-bromo-fatty acids are especially preferred for use in the process according to the invention.

With the extractants according to the invention the extraction can be carried out within a relatively wide pH range, and calcium oxide or hydroxide or rock carbonates such as limestone or dolomite can be used for the neutralization of the aqueous phase. The solubility of these extractants as well as of their transfer compounds is very low in the aqueous phase and satisfactorily high in those solvents which are readily available for use in practice. These extractants allow clear phase separation even at high transfer compound concentrations in the solvent phase, e.g. of the order of 0.6 to 0.8 molar.

Solvents for use in the extraction processes according to the invention must be substantially inert toward the substances contained in the aqueous medium, the extractant and the transfer compound. Especially suitable are hydrocarbons, e.g. kerosene and the commercial xylenes, and halogenated hydrocarbons.

The recovery of the metal from the transfer compound in the form of an inorganic salt and its simultaneous retransfer into an aqueous phase by treatment of the solvent phase with an aqueous mineral acid are effected after the separation of the solvent phase from the original aqueous phase. The required quantity of mineral acid is substantially equivalent stoichiometrically to the metal being transferred. Since the extractant has a very limited solubility in the aqueous phase it remains almost completely in the solvent phase and can be re-used after the decomposition for the extraction of another amount of metal from the aqueous liquor.

The presence of an inorganic metal salt in the aqueous acid used for the decomposition of the transfer compound does not diminish the efficiency of the decomposition operation if sufficient free mineral acid is present. Thus, where the metal to be extracted is copper and the transfer compound, therefore, is a copper compound of the $\alpha$-halogeno-carboxylic acid, spent electrolyte or other partially depleted liquors still containing sizable amounts of dissolved copper can be used for the liberation of the copper from the transfer compound, whereby these regenerating acid liquors are regenerated and replenished themselves.

The extraction process may be carried out in practice in different ways. Some of these are indicated below, it being understood that these are only examples of possible procedures and the list is by no means exhaustive:

(a) The aqueous solution containing the metal to be extracted and a neutralizing agent, e.g. limestone, is admixed with the solvent containing the extractant in an amount substantially equivalent stoichiometrically to the amount of said metal in the aqueous phase. In the case of copper, for example, substantially complete extraction will in this manner be attained at a pH below 5.

(b) The extractant is used in considerable excess over the metal to be extracted, e.g. about twice the stoichiometrically equivalent proportion, and a rock carbonate is added to the aqueous phase in order to neutralize the acid liberated in the aqueous phase. The use of an excess of the extractant permits the extraction at a lower pH. For example, in the case of copper, substantially complete extraction can thus be achieved at a pH of about 3. The possibility of performing the extraction at a low pH can be of great practical importance for separation operations as the pH range for the extraction may overlap from metal to metal to a greater or lesser extent.

(c) The extractant dissolved in the solvent is neutralized in the solvent by $CaCO_3$ or $Ca(OH)_2$. The degree of neutralization is a function of the base used and of the temperature of neutralization. When this solvent solution containing the Ca-compound of the extractant is mixed with the aqueous solution containing the salt of the metal to be extracted in an amount stoichiometrically equivalent to the calcium present, a double-decomposition reaction takes place immediately, whereby the calcium ions are transferred to the aqueous phase, and the metal ions to the solvent phase. In this manner, complete extraction can be achieved at a relatively low pH, e.g. below 4 for copper. This procedure may be important in those cases where a number of metals compete for the extractant; it becomes thus possible to control the quantity of calcium ion and thereby the degree of reaction.

The invention is illustrated by the following examples to which it is not limited:

*Example 1*

Oxidised copper ore is leached with sulfuric acid to give a leach liquor containing 10 g. of Cu/l. as $CuSO_4$. if the pH is lower than 3, sufficient finely ground $CaCO_3$ is added to adjust it to 3. The liquor is separated from the precipitated $CaSO_4$ and is ready for extraction.

100 litres of this solution is mixed with 80 litres of a kerosene solution containing 17.7 kg. of $\alpha$-bromo-lauric acid (being double the stoichiometric equivalent of the copper present) and the mixture is stirred continuously, while limestone is added to maintain the pH above 3. After one hour the reaction is substantially complete and 90% of the copper has been transferred to the solvent phase which becomes dark green in colour. The phases are separated, the solvent phase is filtered, then mixed with 25 litres of aqueous sulfuric acid containing 1.7 kg. of $H_2SO_4$ (100%). By this means the Cu compound in the solvent phase is decomposed and the copper transferred to the aqueous phase. The blue aqueous solution contains 36 g. of Cu/l and 12 g./l. of free $H_2SO_4$. The regenerated extractant remains essentially in the solvent phase and is ready for re-use.

*Example 2*

The process is performed in the manner described in Example 1, except that the extractant is $\alpha$-bromo-myristic acid dissolved in kerosene, and 800 mls. of the kerosene solution containing 195 g. (double the stoichiometrically required amount) of extractant is used per litre of leach liquor.

*Example 3*

One litre of a copper sulfate solution containing 5 g. of Cu, 0.5 g. of Al, 0.1 g. of $Fe^{3+}$ and 3.7 g. of $P_2O_5$ at pH 2 is mixed with 400 mls. of a kerosene solution containing 89 g. (double the stoichiometrically required amount, calculated for the copper) of $\alpha$-bromo-lauric acid. The mixture is agitated while finely ground limestone is added to bring the pH to 3.2. At the end of one hour the extraction of copper amounts to 90%. Less than 5% of the Fe present and no Al are co-extracted. The green solvent phase is separated, filtered and mixed with 125 mls. of aqueous $H_2SO_4$ containing 10 g. of $H_2SO_4$ (100%) to decompose the copper compound. The copper transfers to the aqueous phase to give a blue copper sulfate solution containing 36 g. of Cu/l. and approximately 12 g./l. of free $H_2SO_4$.

*Example 4*

Oxidised copper ore is leached with $H_2SO_4$ to give a solution containing 5 g./l. of Cu at pH 1.9.

One litre of this leach liquor is mixed with 400 mls. of xylene solution containing 132 g. of $\alpha$-bromo-heptanoic acid and the mixture is agitated while so much finely ground limestone is added that the pH rises to 4.8. At this stage 70% of the copper is transformed into the transfer copper compound of $\alpha$-bromo-heptanoic acid;

the solvent phase containing 3.5 g. of Cu is separated from the aqueous phase, filtered and mixed with 100 mls. of 5% aqueous hydrochloric acid to give an aqueous solution of copper chloride containing 35 g. of Cu/l. The regenerated extractant remains dissolved in the xylene and is ready for re-use, e.g. in a second-stage extraction of the same batch of leach liquor with a view to recovering a further portion of copper.

Example 5

One litre of the same leach liquor as in Example 4 is mixed with 800 mls. of a xylene solution containing 106.5 g. of $\alpha$-bromo-palmitic acid. The mixture is stirred while so much finely ground limestone is added that the pH rises to 6, when the reaction is 90% complete. The separated organic phase containing 4.5 g. of Cu is treated with 250 mls. of 10% aqueous $H_2SO_4$ to decompose the copper compound. The aqueous copper sulfate solution thus obtained contains 18 g. of Cu/l. and approximately 60 g./l. of free $H_2SO_4$.

Example 6

$CuSO_4$ leach liquor containing 10 g. of Cu/l., 0.5 g. of Al/l., 0.2 g. of $Fe^{3+}$/l. and 4 g. of $P_2O_5$/l. at pH 1.9, and a 0.8 N-solution of $\alpha$-bromo-lauric acid in kerosene are fed concurrently and continuously at rates of 1000 l./h. and 800 l./h., respectively, to three reaction vessels having each a capacity of 600 litres and being connected in series and provided with stirrers. Finely ground limestone slurried in water is fed continuously to each of the three vessels to maintain a pH of 3 throughout. The mixture of phases leaving the third vessel enters a settler where phase separation occurs. Precipitated $CaSO_4$ and any unreacted limestone settle in the aqueous phase which contains less than 1 g. of Cu/l. The clear green organic phase is withdrawn continuously and transferred to a mixer into which spent electrolyte from an electrowinning cell is fed continuously. The spent electrolyte is mixed with the organic extract in such a proportion that the copper is completely transferred to the aqueous phase. The spent electrolyte contains 20 g. of Cu/l. and 60 g. of free $H_2SO_4$ per litre; the replenished electrolyte obtained contains 40 g. of Cu/l. and 30 g. of free $H_2SO_4$. The mixture of phases passes to a settler. The heavy aqueous phase is drawn off and after filtration is sufficiently pure (less than 50 mg. Fe/l.) for charging the electrowinning circuit, the light phase containing the extractant is recycled to the extraction operation.

Example 7

5 kg. of 200 mesh limestone is slurried in 10 litres of water and mixed for 10 minutes with 90 litres of 0.8 N-$\alpha$-bromo-lauric acid in kerosene. Then, the solution is filtered to remove excess $CaCO_3$ and the clear filtrate is stirred for 3 minutes with 100 litres of $CuSO_4$ leach liquor containing 10 g. of Cu/l. at pH 1.9. At the end of this time the phases are allowed to separate, the pH of the aqueous phase being 3.3; the extraction of copper amounting to 95%. The organic phase is treated with acid in the manner described in any of the preceding examples.

Example 8

The process is carried out as described in Example 7, except that 1.3 kg. of $Ca(OH)_2$ is used instead of 5 kg. of limestone. The degree of extraction is again 95%.

Example 9

1.1 g. equivalent of $CaCO_3$ slurried with water is fed continuously to a mixer concurrently with 2.2 g. equivalent of $\alpha$-bromo-lauric acid dissolved in kerosene to give a 0.8 N-solution. The kerosene solution leaving the mixer contains the calcium compound of the extractant and is fed continuously to a second mixer in co-current with leach liquor containing Cu stoichiometrically proportional to the Ca feed. The Ca-compound of the extractant and $CuSO_4$ undergo double decomposition, $CaSO_4$ precipitates and the Cu-transfer compound dissolves in the kerosene. After leaving the mixer the two phases are allowed to separate and the solvent phase is treated further with spent electrolyte as in Example 6.

Example 10

100 millilitres of a copper sulfate solution containing 5.0 g. of Cu per litre at the pH of 1.9 is mixed with a solution of 8.0 g. of $\alpha$-chlorolauric acid and 5 millilitres of octanol in 35 millilitres of kerosene, and the mixture is stirred while so much finely ground limestone is added that the pH of the mixture is raised to 3.5. The mixture is then allowed to stratify and the extract layer separated from the raffinate. 55% of the copper is thus extracted in one operation.

Example 11

100 millilitres of the same copper sulfate solution as in Example 10 is mixed with 40 millilitres of 8.9 g. of $\alpha,\alpha$-dichlorolauric acid dissolved in kerosene and the mixture is stirred while so much finely ground limestone is added that the pH is raised to 3.6. After stratification of the mixture and removal of the extract layer from the raffinate, 67% of the copper is found to have been extracted.

Example 12

A sodium sulfate solution containing per litre about 200 g. of $Na_2SO_4$ and 0.57 g. of $Fe^{3+}$ is purified by the extraction of the iron with $\alpha$-bromo-lauric acid as an extractant. One litre of the sodium sulfate solution having an initial pH of about 3.5 is mixed with 120 ml. of a 0.5 N-kerosene solution of $\alpha$-bromo-lauric acid. In the course of the operation the pH of the aqueous solution drops to 2.9 while 96% of the $Fe^{3+}$ is extracted into the solvent from which it can be eliminated by treatment with aqueous sulfuric or hydrochloric acid, e.g. according to any of Examples 1 to 5, if it is desired to regenerate the extractant.

Example 13

An aqueous cobalt sulfate solution containing 29 g. of Co per litre, can be freed from accompanying nickel sulfate corresponding to 1.5 g. of Ni per litre. For this purpose, one litre of the aqueous solution is stirred for 45 minutes with 300 ml. of a 1 N-kerosene solution of $\alpha$-bromo-lauric acid, whereby more than 90% of the nickel is extracted into the kerosene phase. During the operation the pH of the aqueous phase at 3.1 through the addition of calcium carbonate. The nickel-containing extract is substantially free of cobalt. The nickel can be removed from the extract by treatment of the latter with aqueous sulfuric acid, e.g. in accordance with any of Examples 1 to 5.

Example 14

An about molar aqueous solution of $CoCl_2$ contaminated with 0.6 g./litre of aluminium (as chloride) is purified by extraction of the aluminium with a 0.8 N-kerosene solution of $\alpha$-bromo-lauric acid. The proportion of the latter is about twice the stoichiometrically required amount, calculated for the aluminium. By the addition of limestone the pH of the aqueous phase is maintained at about 3.1. After separation of the layers the aqueous cobalt chloride solution is substantially free of aluminium. The aluminium extract is substantially free of cobalt.

Example 15

From aqueous leach solutions deriving from an ore previously subjected to sulfatising roast and containing per litre 60 g. of $Cu^{2+}$, 10 g. of $Fe^{3+}$, 104 g. of $Zn^{2+}$ and 5 g. of $H_2SO_4$, substantially pure solutions of each of these ionic constituents can be obtained by selective extraction with $\alpha$-bromo-lauric acid. This is used in a 0.8 N-kerosene solution.

First $Fe^{3+}$ is extracted with three times the stoichiometrically required amount of α-bromo-lauric acid, calculated for the Fe present. During this stage the pH of the aqueous phase is maintained at 2.0 by the addition of finely ground and slurried limestone. The $Fe^{3+}$ is extracted into the solvent phase without being accompanied by copper or zinc. From the extract the iron is transferred into aqueous sulfuric acid, whereby the α-bromo-lauric acid is regenerated.

After the removal of the $Fe^{3+}$ from the aqueous phase the copper is selectively extracted with twice the stoichiometrically required amount of α-bromo-lauric acid, calculated for the copper present. The copper is transferred quantitatively into the solvent phase at a pH of 3.5 of the aqueous phase, where this pH is maintained by the addition of finely ground limestone slurried in water. The copper extract is substantially free of iron and zinc. It is recovered by treatment of the extract with aqueous sulfuric acid.

The aqueous raffinate, i.e. the leach solution remaining after the extraction of the iron and copper, now contains the original amount of zinc sulfate substantially free of iron and copper.

*Example 16*

One litre of an aqueous aluminium sulfate solution containing about 13.5 g. of Al per litre is mixed with so much of a 0.8 N-kerosene solution of α-bromo-lauric acid that the latter corresponds to twice the stoichiometrically required amount. The pH of the aqueous phase is maintained during the operation at 3.3–3.4 by the gradual addition of a slurry of limestone in water. 93% of the aluminium is extracted into the solvent phase. The solvent extract is then treated with 74 g. of $H_2SO_4$ in the form of a 35% aqueous solution whereby a super-saturated aqueous solution of $Al_2(SO_4)_3$ is obtained.

What we claim is:

1. A process for recovering metals from aqueous solutions containing the water-soluble metal salts thereof which comprises contacting said aqueous solution with an alpha-halogeno-carboxylic acid and a substantially water-immiscible organic solvent to form a transfer compound of the alpha-halogeno-carboxylic acid and a dissolved metal salt which has a low solubility in the aqueous solution and a high solubility in the water-immiscible solvent and recovering the metal thus extracted from the aqueous solution from the organic solvent.

2. The process according to claim 1 in which the transfer compound is recovered from the organic solvent by decomposition with an aqueous acid.

3. The process according to claim 2 in which the alpha-halogeno-carboxylic acid is an alpha-bromo fatty carboxylic acid.

4. The process according to claim 2 in which the aqueous acid used to decompose the transfer compound is of sufficient concentration to insure the presence of the cation of the metal extracted in a higher concentration than in the original aqueous solution from which it was extracted.

5. The process according to claim 1 in which the aqueous solution contains a neutralizing agent in a sufficient amount to produce a predetermined pH for optimum extraction of the metal salt.

6. The process according to claim 4 in which the alpha-halogeno-carboxylic acid is used in an amount substantially equivalent stoichiometrically to the amount of said metal salt in the aqueous solution to be extracted.

7. The process according to claim 4 in which the amount of alpha-halogeno-carboxylic acid is in excess of the amount of the metal salt in the aqueous solution to be extracted.

8. The process according to claim 6 in which the alpha-halogeno-carboxylic acid is used in an amount at least twice the equivalent stoichiometric amount of the metal salt in the aqueous solution to be extracted.

9. The process according to claim 1 in which the alpha-halogeno-carboxylic acid is dissolved in the organic solvent and is neutralized with a neutralizing agent before being admixed with the aqueous solution containing the metal salts to form the salt of the alpha-halogeno-carboxylic acid and in which the salt of the alpha-halogeno-carboxylic acid thus formed is subjected to a double decomposition reaction with the metal salt contained in the aqueous solution to be extracted.

10. The process according to claim 1 wherein the aqueous solution contains a plurality of metal salts and in which the pH of the aqueous solution is adjusted before it is contacted with the alpha-halogeno-carboxylic acid and water-immiscible organic solvent to permit the selective extraction of only one of the plurality of metal salts contained in the aqueous solution.

References Cited by the Examiner

UNITED STATES PATENTS

| | | | |
|---|---|---|---|
| 2,227,833 | 1/1941 | Hixson et al. | 23—312 X |
| 2,741,628 | 4/1956 | Plucknett | 23—312 X |
| 2,809,091 | 10/1957 | Jonke | 23—312 X |

OSCAR R. VERTIZ, *Primary Examiner.*

MAURICE A. BRINDISI, *Examiner.*

H. T. CARTER, *Assistant Examiner.*